Patented Mar. 29, 1938

2,112,578

UNITED STATES PATENT OFFICE 2,112,578

SHEATHED ELECTRODE

Hans Röhrig, Lautawerk/Lausitz, Germany

No Drawing. Application December 4, 1936, Serial No. 114,279. In Germany December 4, 1935

6 Claims. (Cl. 219—8)

As is well known, welding seams free of objection could not be obtained hitherto with use of the known electrodes for the arc welding of light metals, particularly aluminium. A fundamental drawback of the seams is their porosity due to gas absorption. Moreover, the irregular burning down of the electrodes very often causes scattering, penetration grooves and the formation of irregular beads.

Rather extensive researches were required to ascertain the cause of these drawbacks, without the removal of which a general use of the arc welding of light metals does not seem possible. In the course of these researches it has been found that the gas absorption is due to the intimate contact between the highly heated metal and the surrounding atmosphere and that it is very important to avoid this contact. For this reason the electrodes have been sheathed or filled with fluxing agents and the main purpose of these sheathings is to sinter the oxide films formed during the heating of the aluminium. These fluxing agents, forming the sheathing of the electrode, however, had to be of such a nature as to solve further problems and in particular to effect stabilizing and ionizing of the arc. Moreover, the sheathing of the electrode must be of sufficient strength to withstand blows or shocks without affecting the ignition capacity and must warrant sufficient safety against the absorption of water from the atmosphere. Finally, the cooled slag charged with oxides must be easily removable.

The closer examination of the reactions taking place during the welding of light metal by means of arc welding has shown that it is impossible to fulfil all the requirements demanded from the sheathing by a covering consisting of a homogeneous mixture.

For instance, a portion of the salts, serving to obtain the solubility of oxide and for adjusting the melting point respectively, are hygroscopic. A satisfactory welding cannot be obtained with wet electrodes on account of the disturbances due to scattering.

Other mixtures which possibly may combine a sufficient impact strength with sufficient ignition capacity melt down unevenly and with difficulty. Consequently projections or serrations remain at the sheathing which render difficult the approach of the electrode to the piece to be welded. If the sheathing is of sufficient fluidity, the covering of the bead very often is not sufficient to prevent air admission, since the slag is too easily removed from the molten metal by the lively moving arc.

These different problems involving sheathing are, according to the invention, simultaneously and completely solved by the fact that the sheathing of the electrode is not homogeneous but consists of layers or zones respectively of different nature or different composition. The effective constituents of the sheathing are therefore distributed upon different zones of the covering.

In this way it is possible, for instance, to arrange the hygroscopic salts at the interior layers of the sheathing and to form the outer layers thereof of substances or mixtures of substances the melting point of which is high enough to warrant a crater-like edge remaining on melting down of the electrode, which crater-like edge serves to guide the arc. It is obvious, that with a uniform distribution of the difficultly melting constituents about the whole cross section of the sheathing, the crater necessary for the stabilizing of the arc cannot so easily be obtained as in the more preferable case in which the outer zones of the sheathing contain the more difficultly melting constituents. At the other hand, it has proved to be of advantage to arrange the easily ionizable constituents of the fluxing agent in the direct neighbourhood of the metal core of the electrode.

The individual layers of the sheathing, arranged upon the rod by dipping the latter into solutions or suspensions containing the corresponding constituents, need not necessarily be separated from each other by intermediate layers. It has, however, been found that such intermediate layers may be very valuable as where special protection against water absorption is required. In this case it has also been proved of particular advantage to incorporate into the intermediate layers a suitable protecting substance such as aluminium-bronze-powder.

In the case of welding of pure aluminium, for instance, a satisfactory sheathing has been one whose inner layer consists of a mixture of alkali-chlorides including lithium-chloride, while the outer layer consists of a mixture of alkali aluminium fluorides with alkali-chlorides. The proportions in which the salts used for forming the different layers are mixed depend on the melting point of the parts to be welded or the melting point of the welding wire respectively.

The following mixture has for instance proved to be satisfactory for pure aluminium:

Inner zone

| | Parts |
|---|---|
| NaCl | 22.5–40 |
| KCl | 37.5–50 |
| LiCl | 10 |
| 5NaF.3AlF$_3$ | 9.5–18 |

Outer zone

| | Parts |
|---|---|
| NaCl | 15 –45 |
| KCl | 30 –50 |
| 5NaF.3AlF$_3$ | 5 –15 |
| Na$_3$.AlF$_6$ | 10 –20 |

If necessary, more than two zones may also be formed. A distribution of the individual mixtures upon the sheathing and the core of hollow welding rods also is advisable.

If more than one layer as the sheathing of the electrode is used, a far greater range in the choice of the mixing proportions is available. Moreover, the individual constituents may be better brought to action than with a homogeneously composed sheathing and more expensive admixtures may for instance be better utilized.

One of the main advantages of the electrode according to the invention consists in this, that the character of the arc may be so influenced that a uniform melting is obtained which hitherto has not been possible. Simultaneously the harmful penetration at the edge of the welding bead is prevented and, due to the increased mixing possibility, such an effective covering of the liquid welding bead with the fluxing agent is obtained that the welding remains free of gas in a manner unknown hitherto.

The electrode according to the invention may also be used for other welding methods in which prevail conditions similar to those in arc welding.

It has further been found, that very good arc weldings of aluminium and aluminium alloys may be obtained by the use of a sheathing of the electrode consisting of a mixture of non-hygroscopic salts having a relatively high vaporization temperature. In particular it has been ascertained that electrodes capable of ignition and warranting a steady arc may be obtained by the use of a sheathing consisting of two different layers. In this case it is of importance, that the inner layer of the sheathing consists of a salt mixture the melting point of which lies above that of the auxiliary metal, while the outer layer consists of a salt mixture the melting point of which lies below that of the auxiliary metal. A highly desired property of the layers of the sheathing is that the resulting melting point of the complete sheathing does not lie above the melting point of the auxiliary metal. For some intended applications the melting point may be somewhat lower.

For the welding of pure aluminium for instance these conditions are fulfilled by the following compositions:

(1) Inner layer: 90 parts of chiolite + 5 parts of NaCl + 5 parts of KCl
(2) Outer layer: 15 parts of cryolite + 10 parts of chiolite + 35 parts of NaCl + 40 parts of KCl.

The melting point of a complete sheathing of the mixture given above may be regulated for the inner and outer layer by providing the two layers in different thicknesses.

In this manner sheathed electrodes are obtained by the use of which pores in the welding bead are avoided which otherwise are present due to hydrogen remaining in the bead in form of bubbles.

Such a sheathing has also the advantage, that at the melting region of the electrode a crater-like edge remains warranting a steady guide for the arc.

The slag deposited upon the welding bead with the use of a sheathing according to the invention is rather brittle and may easily be removed from the welded parts by descaling.

What I claim is:

1. An electrode comprising a sheathed metal rod adapted for the arc welding of light metals and alloys of light metals, said sheath comprising an inner layer of a mixture of alkali-chlorides and an outer layer of a mixture of aluminium fluorides and alkali-chlorides.

2. An electrode comprising a sheathed metal rod adapted for the arc welding of light metals and alloys of light metals, said sheath comprising an inner layer of a mixture of alkali-chlorides, consisting of approximately 22.5–40 parts of sodium chloride, approximately 37.5–50 parts of potassium chloride, approximately 10 parts of lithium chloride and approximately 9.5–18 parts of chiolite and an outer layer of a mixture of aluminium fluorides and alkali chlorides, consisting of approximately 15–45 parts of sodium chloride, approximately 30–50 parts of potassium chloride, approximately 5–15 parts of chiolite and approximately 10–20 parts of cryolite.

3. An electrode comprising a sheathed metal rod adapted for the arc welding of light metals and alloys of light metals, the sheath of which comprises an inner layer of a salt mixture having a melting point above that of the metal rod and an outer layer of a salt mixture having a melting point below that of the metal rod.

4. An electrode comprising a sheathed metal rod adapted for the arc welding of light metals and alloys of light metals, the sheath of which comprises an inner layer of approximately 90 parts of chiolite, approximately 5 parts of sodium chloride and approximately 5 parts of potassium chloride, and an outer layer of approximately 15 parts of cryolite, approximately 10 parts of chiolite, approximately 35 parts of sodium chloride and approximately 40 parts of potassium chloride.

5. An electrode comprising a sheathed metal rod adapted for the arc welding of light metals and alloys of light metals, said sheath comprising a plurality of layers at least one of which contains non-hygroscopic salts having a high vaporization temperature and said layers having a common melting point equal to that of the metal rod.

6. An electrode comprising a sheathed metal rod adapted for the arc welding of light metals and alloys of light metals, said sheath comprising a plurality of layers, at least one of which contains non-hygroscopic salts having a high vaporization temperature and said layers having a common melting point lying below that of said metal rod.

HANS RÖHRIG.